US007900525B2

(12) United States Patent
Hood

(10) Patent No.: US 7,900,525 B2
(45) Date of Patent: Mar. 8, 2011

(54) CATHODE HANDLER SYSTEM

(76) Inventor: Darden Gwaltney Hood, Miami, FL (US)

( * ) Notice: Subject to any disclaimer, the term of this patent is extended or adjusted under 35 U.S.C. 154(b) by 475 days.

(21) Appl. No.: 12/156,103

(22) Filed: May 29, 2008

(65) Prior Publication Data

US 2009/0293650 A1 Dec. 3, 2009

(51) Int. Cl.
*G01N 21/69* (2006.01)
*H01J 49/04* (2006.01)
*B01D 59/44* (2006.01)

(52) U.S. Cl. .................. 73/864.82; 73/864.83; 250/288; 250/281; 356/316; 313/231.01

(58) Field of Classification Search .................. 250/288, 250/281; 313/231.01; 73/864.82, 864.83; 356/316
See application file for complete search history.

(56) References Cited

U.S. PATENT DOCUMENTS

| | | | | |
|---|---|---|---|---|
| 6,815,666 | B2 | 11/2004 | Schroeder et al. | |
| 6,852,969 | B2 * | 2/2005 | Marcus et al. | 250/288 |
| 2005/0012038 | A1 * | 1/2005 | Marcus et al. | 250/288 |
| 2009/0250347 | A1 * | 10/2009 | Powell et al. | 204/549 |

* cited by examiner

*Primary Examiner* — Nikita Wells
(74) *Attorney, Agent, or Firm* — Malloy & Malloy, P.A.

(57) ABSTRACT

A pre-assembled, disposable cathode handler assembly facilitates automated or manual loading of a cathode with analyte for spectrometric analysis and is intended for a single use application. This cathode handler assembly is comprised of several parts which work cooperatively together to stabilize a separate cathode and direct an analyte into the cathode. A stopper and channeling unit are disposed in supporting interconnection with the cathode so as to maintain it in a stable orientation for loading. The channeling unit may be used in combination with a liner which also interacts with the cathode to guide the analyte into an interior chamber therein, and further contains an analyte cap holder. A stopper prevents the introduced analyte from escaping the cathode and a housing is connected exteriorly of the cathode and supporting components to further stabilize the cathode during the loading procedure. A loading base may be integrated to assist in manual loading of a cathode.

32 Claims, 9 Drawing Sheets

CATHODE HANDLER SYSTEM

FIELD OF THE INVENTION

The present disclosure is directed to a pre-assembled, disposable cathode handler assembly structured to facilitate the efficient loading of a cathode with a sample analyte, which is subsequently utilized in spectrometric analysis. The cathode handler assembly is structured to be utilized with any one of a plurality of different cathodes.

DESCRIPTION OF THE RELATED ART

Mass spectrometry has been a useful chemical analytical tool since its inception in the late 1800's. This technology utilizes the charge-to-mass ratio of charged particles to separate charged particles from within a molecule or sample, thus identifying the isotopic composition of the sample analyte. With the advent of electrostatic accelerators, accelerator mass spectrometry (AMS) allows for the detection and identification of even trace amounts of atomic isotopic ratios. This highly sensitive technique has gained appreciation and is enabling rapid changes to take place in biosciences and pharmaceutical development. For instance, the ultrahigh sensitivity of AMS allows for the detection of $^{14}C$ a very rare and unstable isotope of carbon, in parts per trillion (attomole) levels within molecular structures. The ability to use and measure "microdose" levels of $^{14}C$ has lead to revolutionary applications within Absorption, Distribution, Metabolism, Excretion studies (ADME). Appreciation for this is evidenced by the U.S. Food and Drug Administrations January 2006 publication *Guidance for Industry, Investigators, and Reviewers Exploratory IND Studies* outlining the use of microdosing in association with its Critical Path Initiative for new drug development.

In order to take advantage of this AMS technology, a sample analyte must first be loaded into a cathode, which in turn becomes part of the ion source used in the AMS instrument. Since a cathode holds only a very minute amount of analyte, the cathode itself may measure fractions of a centimeter in length. The small size of the cathode, combined with the even smaller diameter of the hole through which to load the analyte, makes the handling of a cathode, for loading purposes, difficult and cumbersome. An instrument for handling and manipulating the cathode which allows for easier analyte loading is therefore needed to increase the efficiency of AMS technology and growth.

In addition to the above, AMS microdosing studies utilized in pharmacokinetic studies require many, many measurements to be made under strictly time constrained conditions to obtain accurate results. Thus, study throughput and new drug development is "bottle-necked" by the steps required to load graphite synthesized from carbon dioxide evolved from the study compound into the cathode. Alternative ion sources utilizing the carbon dioxide rather than graphite are under study thereby eliminating the need for graphite preparation and cathode loading. However, carbon dioxide analysis is inhibited by technological limitations associated with gas manipulation, memory effects within the AMS, lower counting efficiencies than graphite and the high cost of carbon dioxide ion sources. Accordingly, a preferred and proposed cathode handler system and assembly solves the "bottleneck" associated with the loading of the graphite into cathode and as such improves the efficiency and efficacy of AMS microdosing utilizing the existing AMS technologies.

SUMMARY OF THE INVENTION

The cathode handler assembly of the present invention is to be used in conjunction with a separate cathode to facilitate the loading of the cathode with an analyte, which is subsequently used in spectrometric analysis. The cathode handler assembly is comprised of a plurality of component parts which work cooperatively together to form a total self contained, preferably pre-assembled assembly that increases the manageability of handling a cathode.

Specifically, the assembled cathode handler system comprises a single use self-contained disposable unit which is discarded after each use. The ultra high sensitivity of AMS requires non-disposable cathode holder systems to be cleaned to a very high level between uses in order to avoid cross contamination between analytes. The cleaning process is time consuming, labor intensive and requires very special care. Accordingly, a preferred and proposed cathode handler assembly would comprise a single unit, different units to be used for different cathode loadings, which would thereby eliminate the need for reuse of cleaned, non-disposable cathode holders. A source of potential error would thereby be eliminated. Such a preferred and proposed cathode handling assembly would also simplify the loading process and reduce the loading labor overhead. It may further provide a potential for higher sample throughput over non-disposable units since this system can be provided pre-assembled, ready to load with analyte. It can be loaded without preparation and inventory of units may not be limited to the number of non-disposable units available between cleaning.

In addition, a channeling unit is located above the cathode or otherwise in direct communication therewith so as to direct and/or introduce analyte into the supported cathode. A liner may be used in conjunction with the channeling unit to further assist in the efficient loading of analyte into the cathode. The channeling unit also may contain an analyte cap holder, which retains analyte cap material until after analyte is loaded. The integration of an analyte cap holder into the assembly further eases the problem of "bottlenecking" by maintaining the analyte cap material, which forms a backing for the analyte and prevents ion sputtering, nearby. A stopper is located beneath or is otherwise positioned in connection with the cathode and in at least partially sealing engagement therewith. Moreover, the stopper is disposed and structured to retain analyte within the cathode. As such, the analyte which is introduced into the cathode is prevented from escape or inadvertent passage there from. This stopper is connected to and/or supported by a housing, which also interacts with the channeling unit to assist in the stabilization of the cathode, especially, but not exclusively, during introduction of the analyte into the cathode.

The present cathode handler assembly is contemplated for both automated and manual loading of a cathode. In the case of manual loading, a support and loading stand may be integrated into the cathode handler assembly which stabilizes the assembly in a position conducive to loading and facilitates efficient loading of analyte.

These and other features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
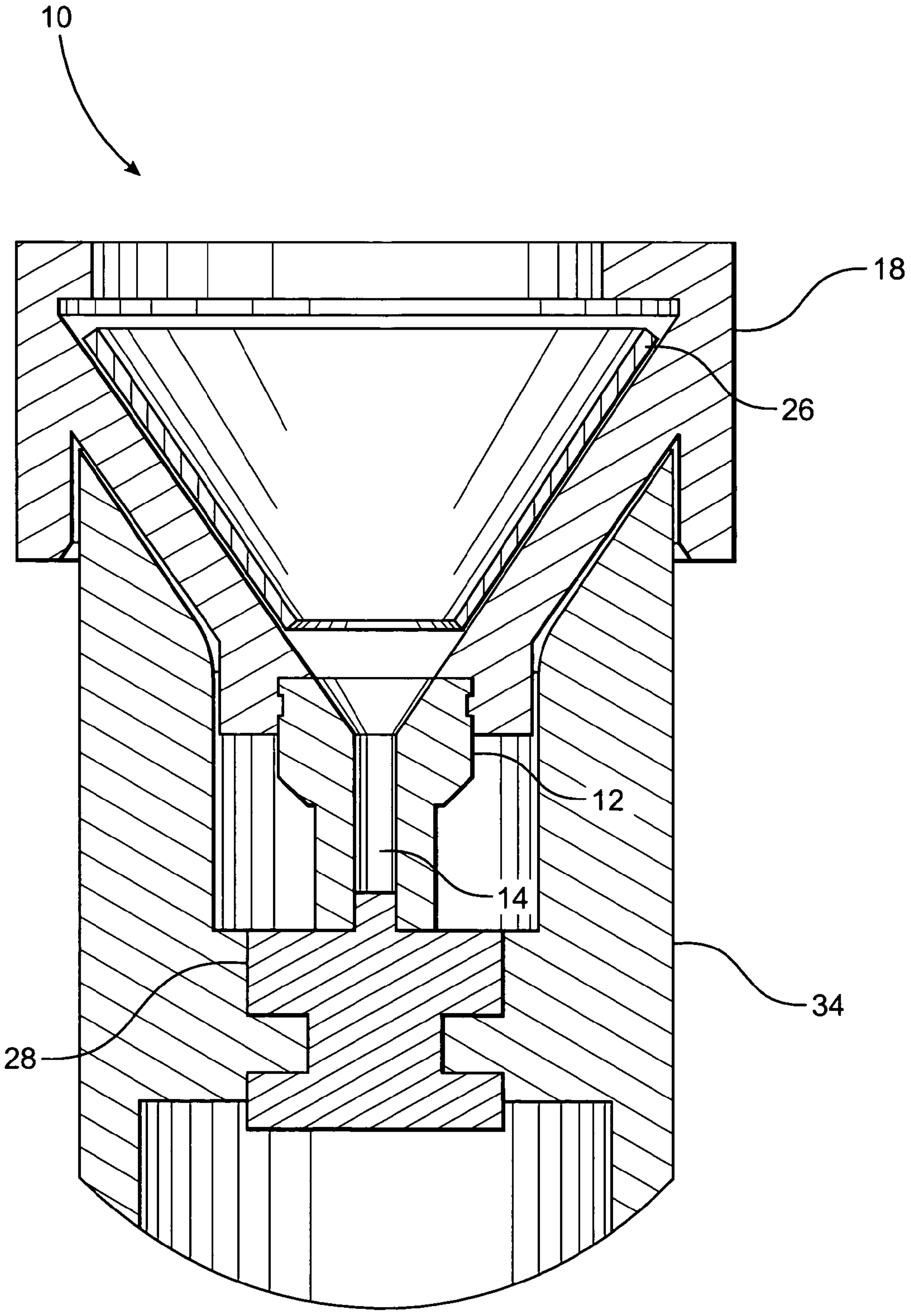
FIG. 1 is a cross-sectional view in partial cutaway of the cathode handling assembly of this invention.

As shown in the accompanying figures, and with particular reference to FIG. 1, the present invention is directed to a cathode handler assembly, generally indicated as 10. This cathode handler assembly 10 works interactively with a separate cathode 12 to facilitate a more efficient and expedient loading of sample analyte into the cathode 12.

The cathode handler assembly 10 comprises a single self-contained unit that is pre-assembled with a select cathode. As such, the cathode can be loaded with analyte without further preparation, therefore simplifying the loading process and reducing the labor overhead. Since it is available in pre-assembled form, the cathode handler assembly 10 provides the potential for a higher sample throughput compared to standard cathode assemblies in the field as it can be loaded faster and easier than conventional cathode assemblies. Moreover, the cathode handler assembly 10 is manufactured of such a material that it is disposable after a single use. Examples of such material include, but are not limited to, plastic, nylon, aluminum, etc. Since each cathode handler assembly 10 is used only once, there is no need to clean and reuse hardware associated with handling the cathode 12. Thus, the cathode handler assembly 10 of the present invention removes the lengthy and arduous cleaning process currently in place, decreasing labor overhead as a result. Also the disposable feature eliminates a source of potential error in spectrometric result output, since the possibility of cross contamination is eliminated.

Figure 2A:
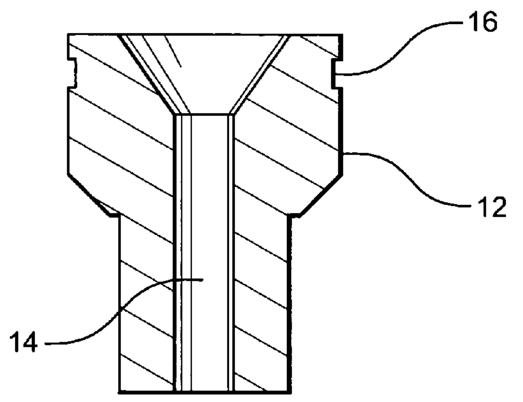
FIG. 2A is a cross-sectional view of a cathode of the embodiment of FIG. 1.
Figure 2B:
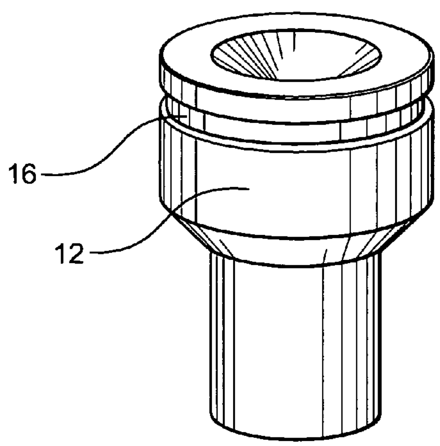
FIG. 2B is a perspective view of the cathode of FIG. 2A.

The cathode handler assembly 10 is comprised of a plurality of components, which are preferably pre-assembled and disposable after use. Each of the plurality of components works interactively to collectively form the complete assembly. As seen in a preferred embodiment represented in FIG. 1, the cathode handler assembly 10 comprises at least a channeling unit 18 and a stopper 28 disposed in connected, supporting relation to the cathode 12. As seen in FIGS. 1, 2A and 2B, the cathode 12 is structured to include an interior chamber 14 which is correspondingly disposed, dimensioned and configured to receive the analyte therein. Moreover, the receipt and maintenance of the analyte in the interior chamber 14 as the stopper and channeling unit are connected to maintain the cathode in a vertical or other appropriate orientation within the cathode handler assembly 10 to facilitate the loading of the cathode with sample analyte.

Figure 3C:
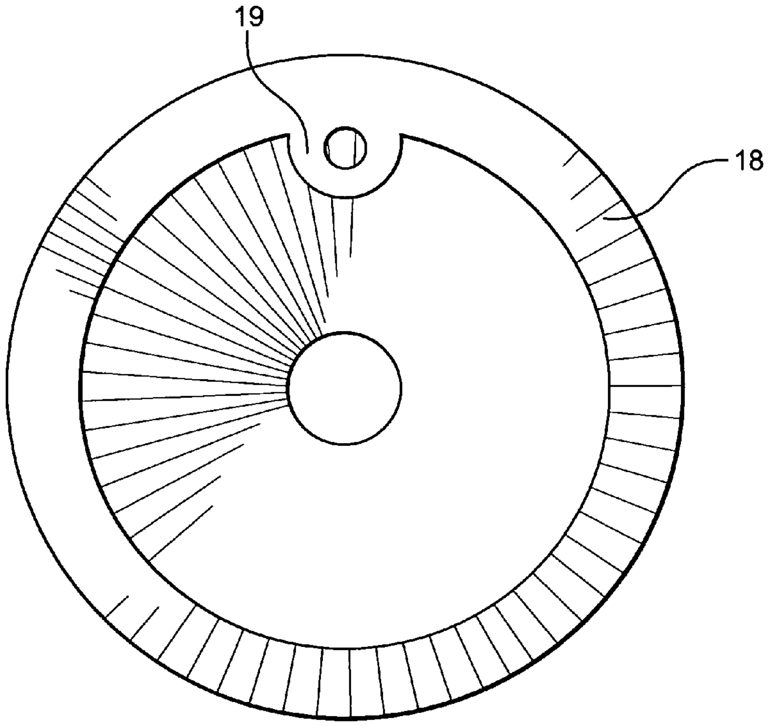
FIG. 3C is a top plan view of the channeling unit of FIG. 3B.
Figure 3A:
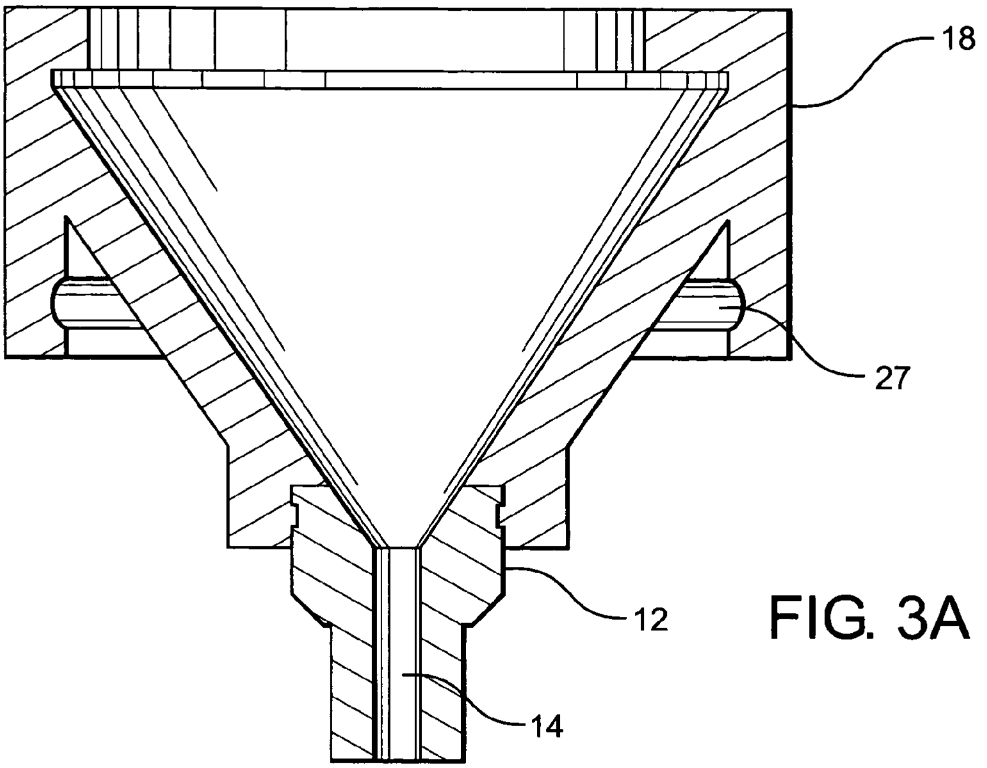
FIG. 3A is a cross-sectional view in partial phantom of the channeling unit and cathode of the embodiment of FIG. 1.
Figure 3B:
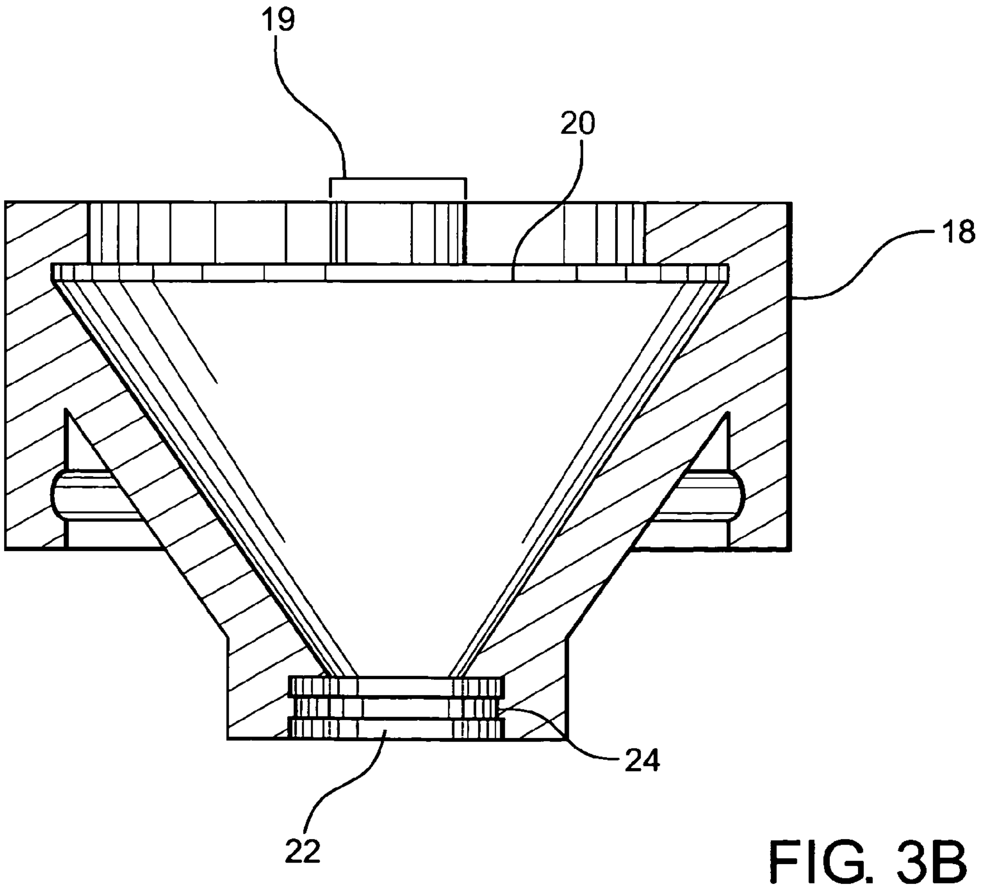
FIG. 3B is a cross-sectional view of the channeling unit of one embodiment.

The channeling unit 18 of FIG. 1 connects to and/or engages the cathode 12 in a location which is preferably opposite the stopper 28 such that the cathode is effectively clamped in a "sandwiched" relation between the channeling unit 18 and the stopper 28. Further, the cooperative connection of the cathode 12 between the stopper 28 and the channeling unit 18 is sufficient to exert a "displacement resisting" force of the cathode 12. In turn, the cathode 12 is maintained in a stable position and/or orientation so as to allow the packing or forced placement of the analyte within the interior chamber 14. In addition, FIG. 3B shows the channeling unit 18 includes an open distal end 20 and an opposite open proximal end 22. The open proximal end 22 of the channeling unit 18 is disposed in direct communicating relation with the cathode 12 at an open end of the interior chamber 14, as represented. The open proximal end 22 of the channeling unit 18 abuts or is otherwise cooperatively and adjacently or contiguously disposed relative to the correspondingly positioned or topmost edge of the interior chamber 14 of the cathode 12. As such, the analyte introduced into the cathode 12 through the channeling unit 18 is directed substantially entirely into the interior chamber 14 of the cathode 12.

Thus, when a cathode 12 is placed in the cathode handler assembly 10 for loading, substantially all analyte introduced in to the channeling unit 18 is consequently directed into the stably supported cathode 12. Thus, the channeling unit 18 of the present invention allows for more efficient loading of sample analyte and eliminates or significantly reduces the possibility of analyte spillage that would occur if direct cathode loading was attempted without the benefit of the structural and operative features of the present invention. Moreover, in at least one preferred embodiment of the present invention it is contemplated that the channeling unit 18 may be, but is not necessarily, of a substantially conical or funnel-like shape to better direct introduced sample analyte into the interior chamber 14 of the supported cathode 12.

The channeling unit 18 also contains an analyte cap holder 19, as seen in. FIGS. 3B and 3C, which is designed to retain analyte cap material during loading of an analyte and subsequently allow the passage of this analyte cap material through an aperture therein once the analyte is properly loaded and packed within the cathode. The analyte cap holder 19 protrudes from the channeling unit 18 such that analyte cap material forced there through follows the same path as the analyte, and indeed, covers the top of the analyte and may be forced into sealing relation over the top of the cathode 12, thus encasing the loaded analyte within the cathode 12 and providing a terminal point for sputtered ion pathway through chamber 14.

Further, the channeling unit 18 may contain at least one exterior groove 24 which matingly fits a corresponding groove 16 in the cathode 12, as displayed in FIG. 3B. These grooves 24 and 16 connect and lock the channeling unit 18 in substantially sealing relation to the cathode 12, thus stabilizing this portion of the cathode handler assembly 10. Similarly, the channeling unit 18 may also contain at least one other exterior groove 27 which matingly fits a corresponding groove 38 in the housing 34 for the increased stabilization of the cathode holder assembly 10, discussed in more detail below.

Figure 4A:
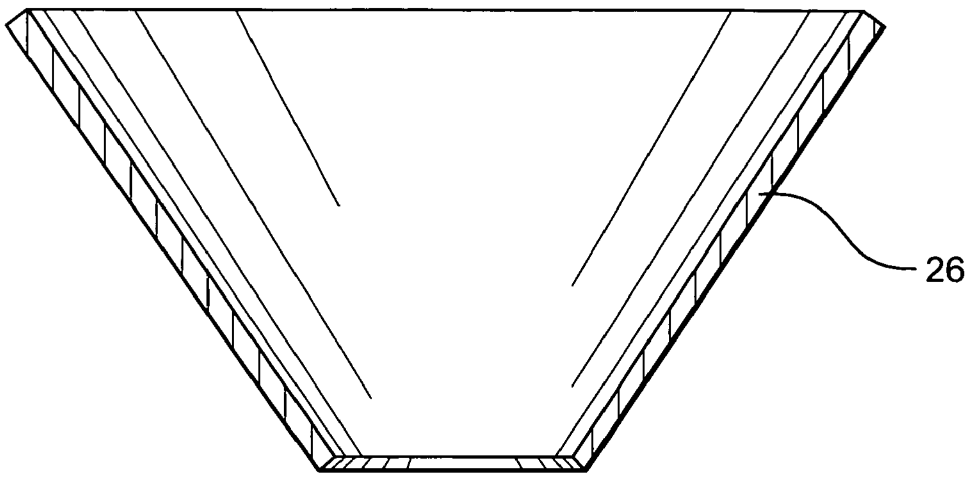
FIG. 4A is a cross-sectional plan view of the liner of the embodiment of FIG. 1.
Figure 4B:
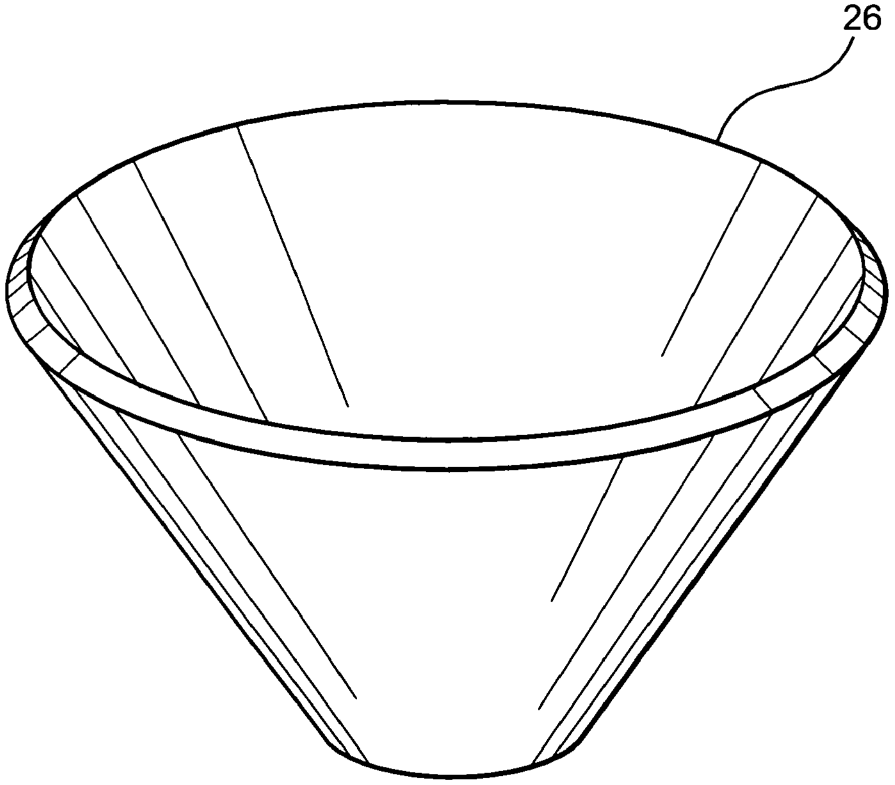
FIG. 4B is a perspective view of the liner of FIG. 4A.

At least one preferred embodiment of the present invention contemplates a liner 26 to be disposed within the channeling unit 18 to further facilitate the transfer of sample analyte into the cathode 12, as in FIGS. 1, 4A and 4B. This liner 26 is disposed in overlying relation to an interior surface of the channeling unit 18, and is structured to be in substantially continuous confronting engagement with the interior surface of the channeling unit 18. Moreover, in at least one embodiment of the present invention, the liner 26 is disposed and dimensioned to extend between the open proximal end 22 and open distal end 20 of the channeling unit 18. Further, the open proximal end 22 is contiguously or adjacently disposed relative to the corresponding opening edge of the interior edge 14 of the cathode 12 to facilitate the transfer of analyte into the interior chamber, as set forth above. Thus, the liner 26 is disposed to at least partially seal the engagement between the channeling unit 18 and the cathode 12 at the opening of the interior chamber 14. The spillage of analyte is thereby eliminated or significantly reduced within the housing 34 of the cathode handler assembly 10 while it is loaded into the cathode 12.

Figure 5A:
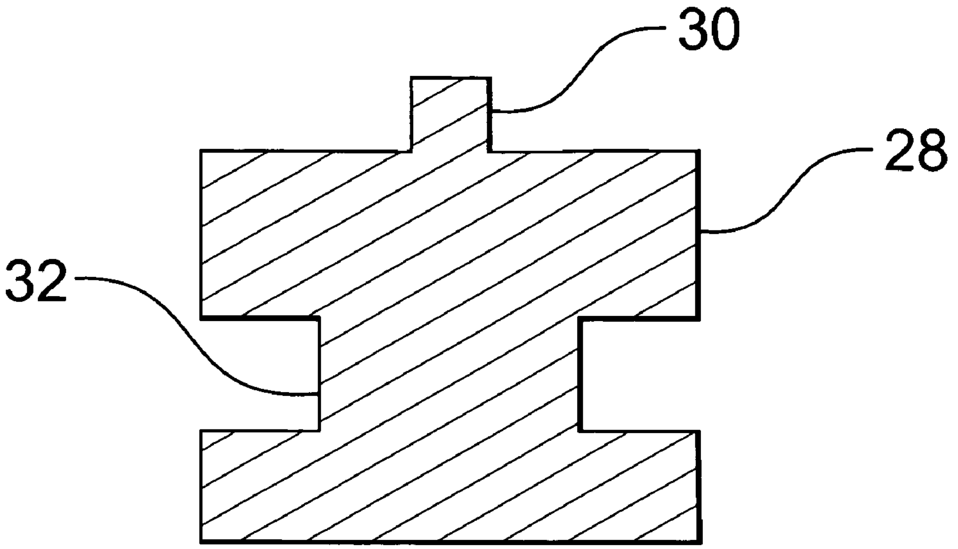
FIG. 5A is a cross-sectional view of the stopper of the embodiment of FIG. 1.
Figure 5B:
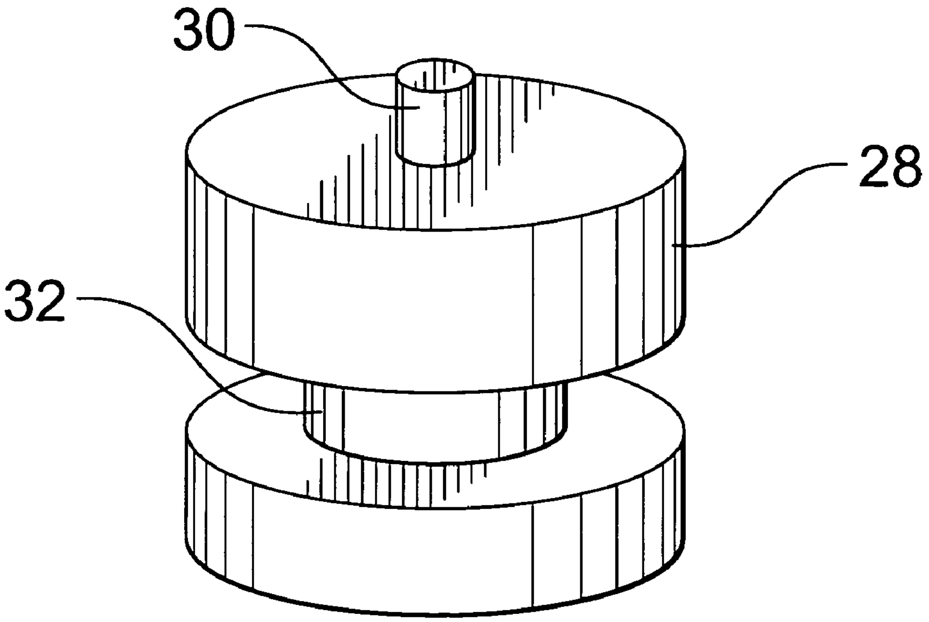
FIG. 5B is a perspective view of the stopper of FIG. 5A.

The stopper 28 as represented in FIGS. 1, 5A and 5B is structured within the cathode handler assembly 10 such that it interacts with the cathode 12 to retain the analyte within the interior chamber 14 of the cathode 12. More specifically, the stopper 28 is dimensioned to at least partially correspond to at least a portion of the cathode 12 at least to the extent of forming an at least partially sealing engagement with the cathode 12. In at least one preferred embodiment, the sealing or retaining function of the stopper 28 is accomplished by a protruding portion or segment 30 of the stopper 28, which is structured to protrude, penetrate or otherwise fit in a mated relation, at least partially, within the interior chamber 14 of the cathode 12, in a manner clearly represented in the above noted Figures.

Such protruding segment 30 extends into interior chamber 14 of the cathode 12 and abuts the bottom or correspondingly disposed portion of the cathode 12 supported therein. Thus, the stopper 28 facilitates the retention of analyte within the cathode as well as supporting the cathode 12 in a stable, displacement resisting disposition within the housing 34. The stopper 28 also possesses at least one exterior groove 32 to interact with the housing 34, described in detail below to further connection with the cathode in a preferred stable manner.

Figure 6A:
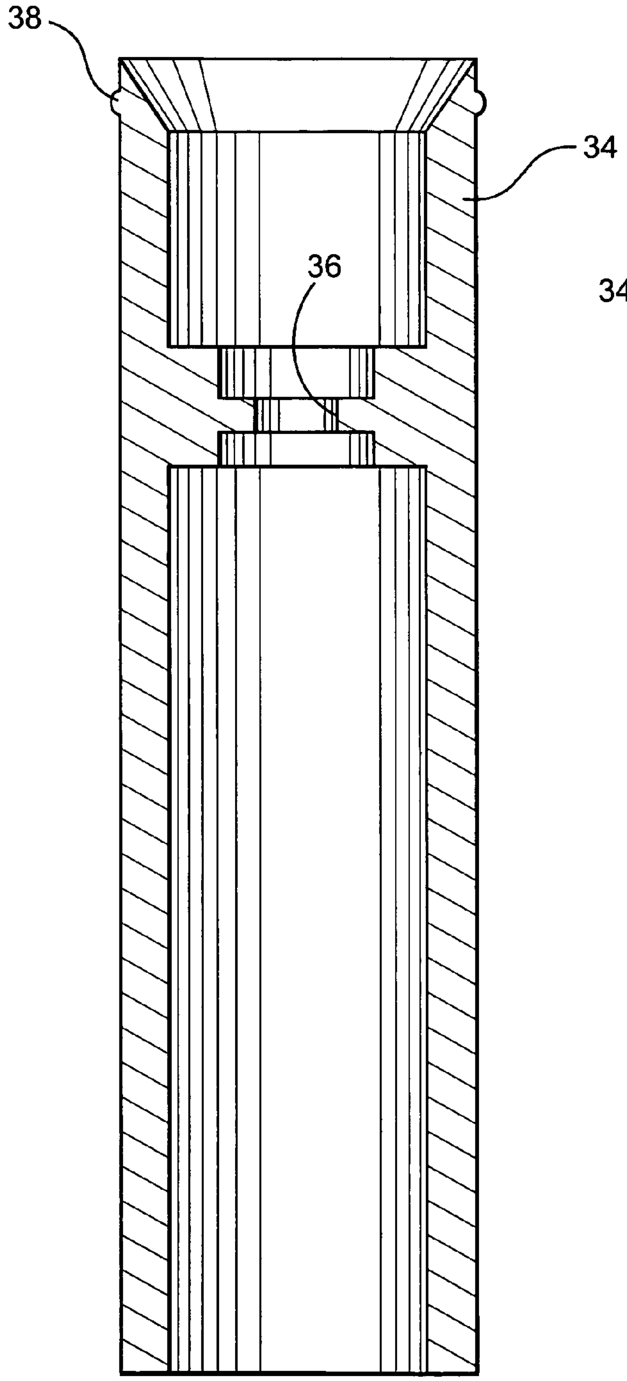
FIG. 6A is a cross-sectional view of the housing of the embodiment of FIG. 1.
Figure 6B:
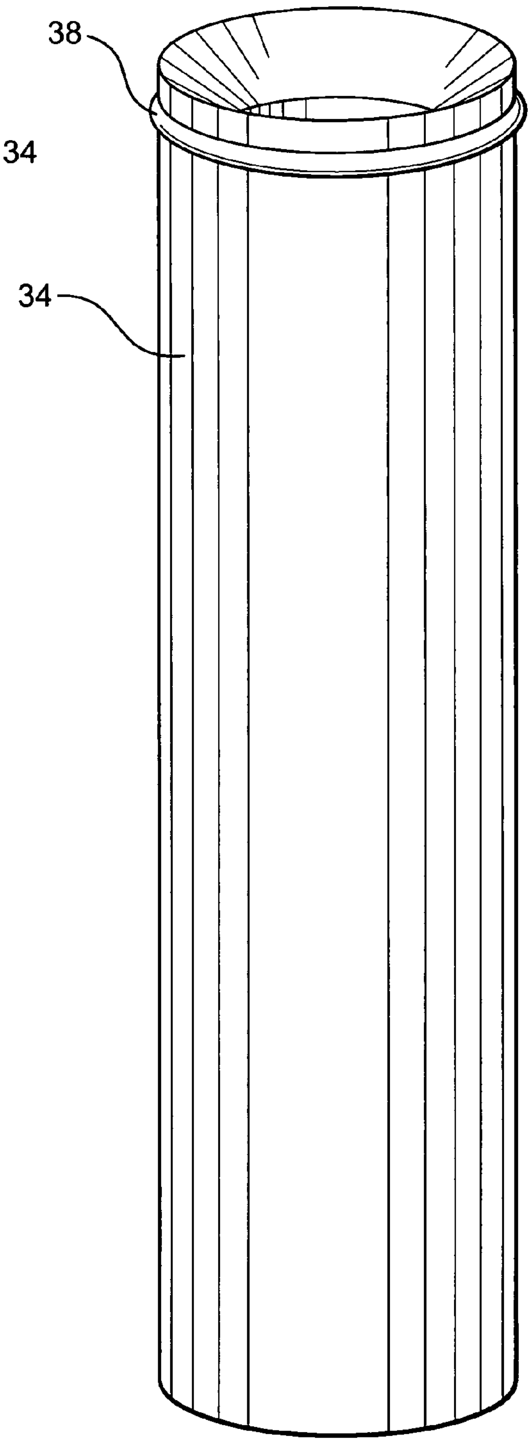
FIG. 6B is a perspective view of the housing of FIG. 6A.

The interconnection and support of the housing 34 with the channeling unit 18 and stopper 28 further serves to stabilize the cathode 12 as seen in FIGS. 1, 6A and 6B. More specifically, the housing 34 contains at least one interior groove 36 which is structured to matingly correspond to an exterior groove 32 of the stopper 28, thereby locking the housing 34 and stopper 28 together and stabilizing the position of the stopper 28 as well as the cathode 12. The housing 34 also contains an exterior groove 38 which matingly fits and locks with a corresponding groove 27 in the channeling unit 18 such that the housing 34 matingly engages the corresponding portion of the channeling unit 18, further increasing the stability of the entire cathode handler assembly 10. Moreover, the groove 38 of the housing 34 and the groove 27 of the channeling unit 18 are disposed such that the channeling unit 18 may be outwardly removed or detached from the housing 34. Otherwise, unless forcibly detached, the channeling unit 18 is in locking engagement with the housing 34, and the cathode handler assembly 10 is intact. One embodiment contemplates the removal of the channeling unit 18 from the housing 34 in a vertical direction, but other outward directions are possible and acknowledged.

Further, as set forth herein, the cathode 12 is interconnected to and supported by the channeling unit 18 and the stopper 28 in a sufficiently stable manner to facilitate and allow pressure to be directed onto the cathode 12 without it being displaced while loading the analyte into the interior chamber 14. Such directed pressure serves to augment the packing of sample analyte in to the cathode 12.

Figure 7:
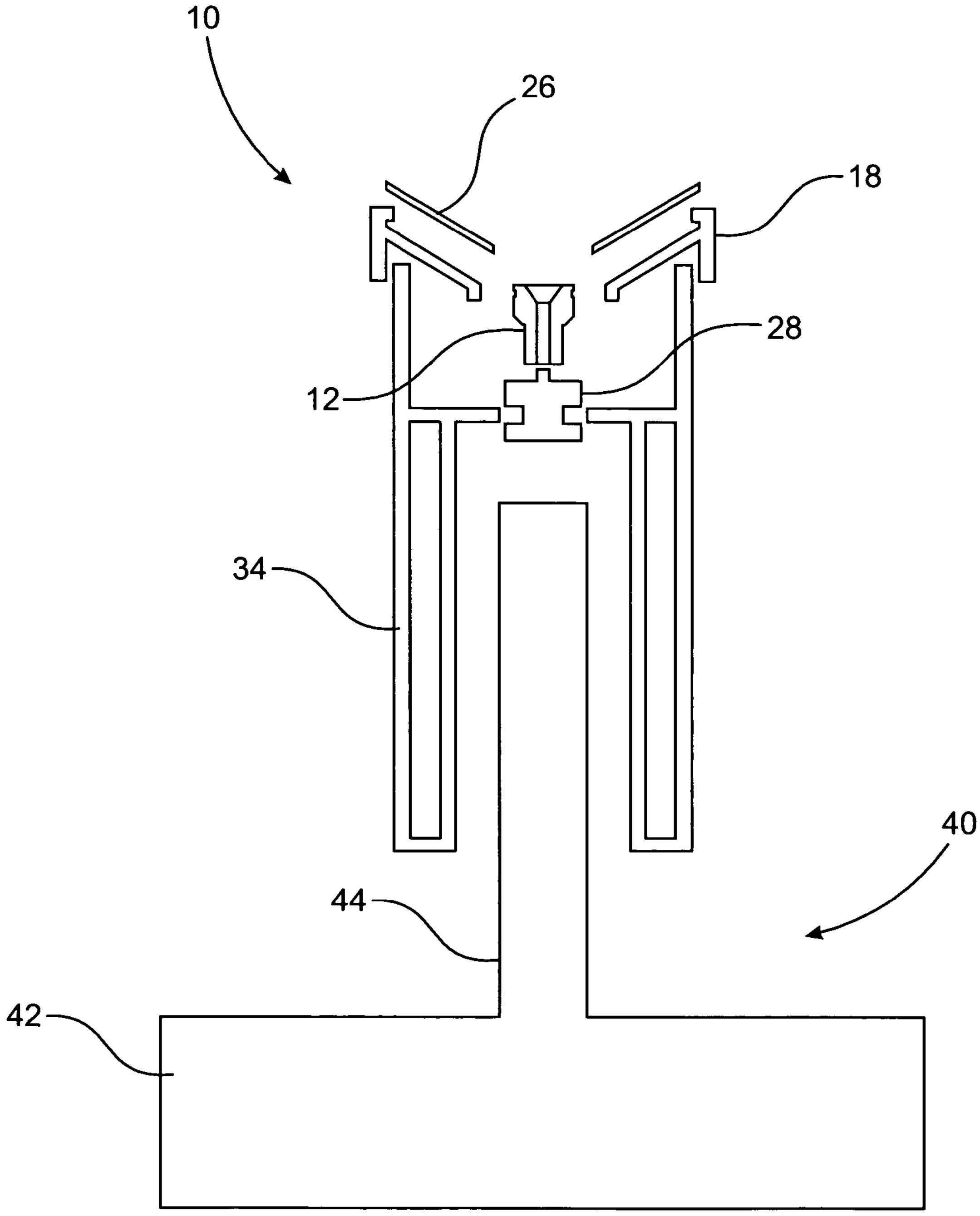
FIG. 7 is an exploded cross-sectional view of the cathode handler assembly and integrated manual loading stand.

It is contemplated that the cathode handler assembly 10 may be used for both automated and manual loading of analyte. Accordingly the cathode holder assembly is adaptable for manual loading utilizing a manual loading stand 40, as represented in FIG. 7, which stabilizes the cathode 12 independently so that a technician may have both hands free to load the cathode 12. The integrated manual loading stand 40 of comprises a base 42 and a stem 44 which together stably support the cathode handler assembly 10 in position. Specifically, the stem 44 extends from the base 42 to a portion of the cathode handler assembly 10. In one embodiment of the integrated manual loading base 40, the stem 44 extends from the base 42 to the stopper 28 of the cathode handler assembly 10.

Figure 8:
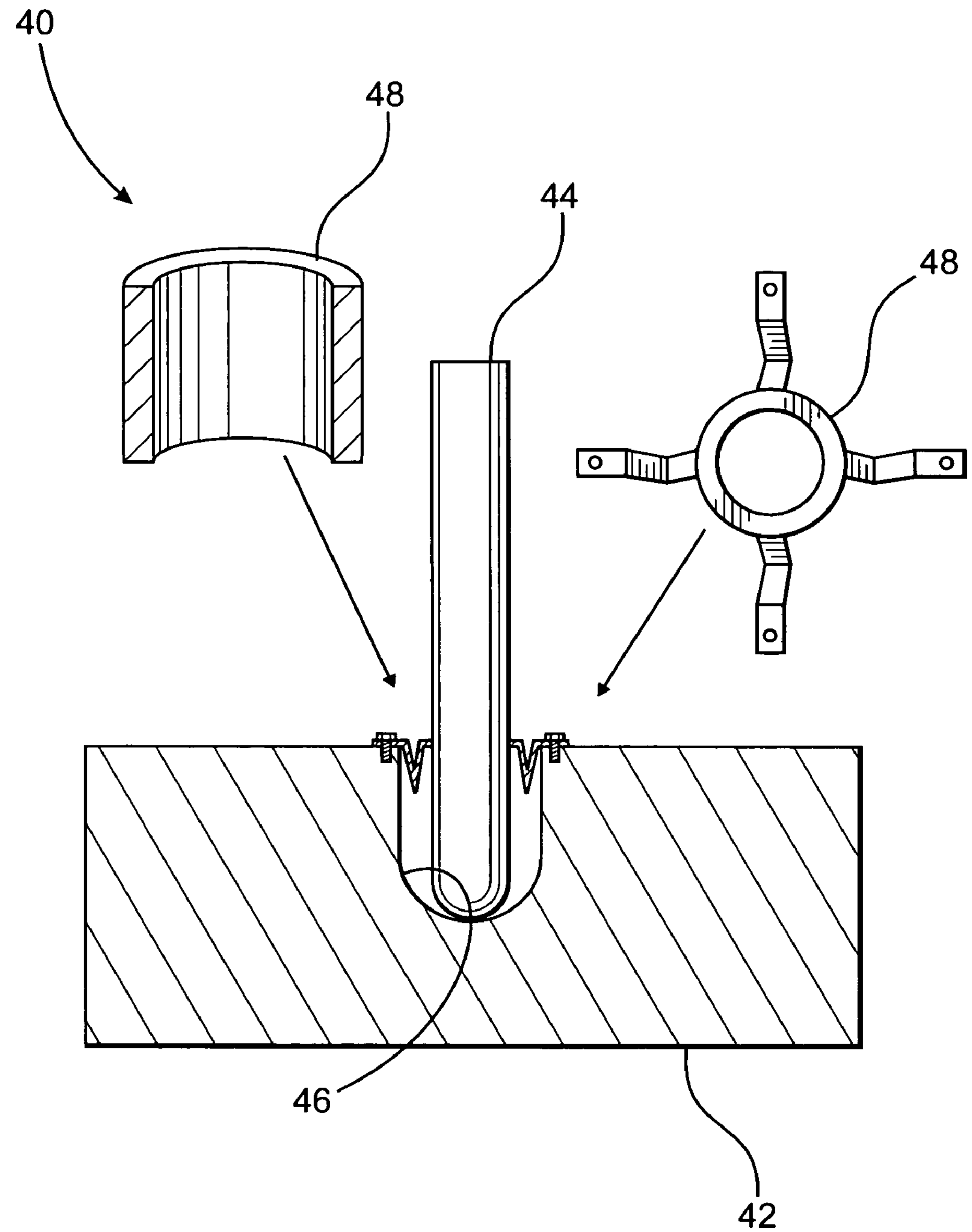
FIG. 8 is a cross-sectional view of the cathode handler assembly and integrated manual loading stand showing exemplar stem collars.

The base 42 comprises a cavity 46 which is structured and dimensioned to receive the stem 44 and support it therein. FIG. 8 shows one such embodiment. The interior walls of the cavity 46 are in spaced relation to the exterior of the stem 44 received therein. As such, there is a gap or space between the sides of the stem 44 and the interior walls of the cavity 46. This allows for at least some movement of the stem 44 within the cavity 46 and the transfer of "vibrations" to the cathode through the stem 44, as will be explained in greater detail hereinafter. More specifically, the bottom of the stem 44 and the bottom of the cavity 46 are cooperatively dimensioned to enhance vibrations produced by tapping or applying other appropriate forces to the stem 44. These vibrations travel up the stem 44 to the cathode 12 and further assist in the efficient packing of the analyte therein. By way of example, in one embodiment the bottom of the cavity 46 and the bottom of the stem 44 are substantially curved in order to facilitate the production and perpetuation of vibrations along the stem 44.

Furthermore, a stem collar 48 at least partially surrounds the stem 44 at the base 42 to permit the stem 44 to vibrate without disrupting the integrity of the manual loading stand 40 or the cathode handler assembly 10. Many variations of the stem collar 48 are contemplated, and are understood to be included herein. Two sample embodiments are illustrated in FIG. 8. In one embodiment, the stem collar 48 is a sleeve disposed at least partially surrounding the stem 44 and between the stem 44 and the inner walls of the cavity 46, as seen in FIG. 8. The material of this example stem collar 48 is permissive of stem 44 movement, such as foam. In another embodiment, also shown in FIG. 8, the stem collar 48 at least partially encircles the stem 44 and comprises a plurality of angled arms which may extend into the cavity 46 and are fastened to the base 42. The angles of the arms allow the stem collar 48 of this embodiment to act as a spring and allow movement of the stem 44.

Figure 9:
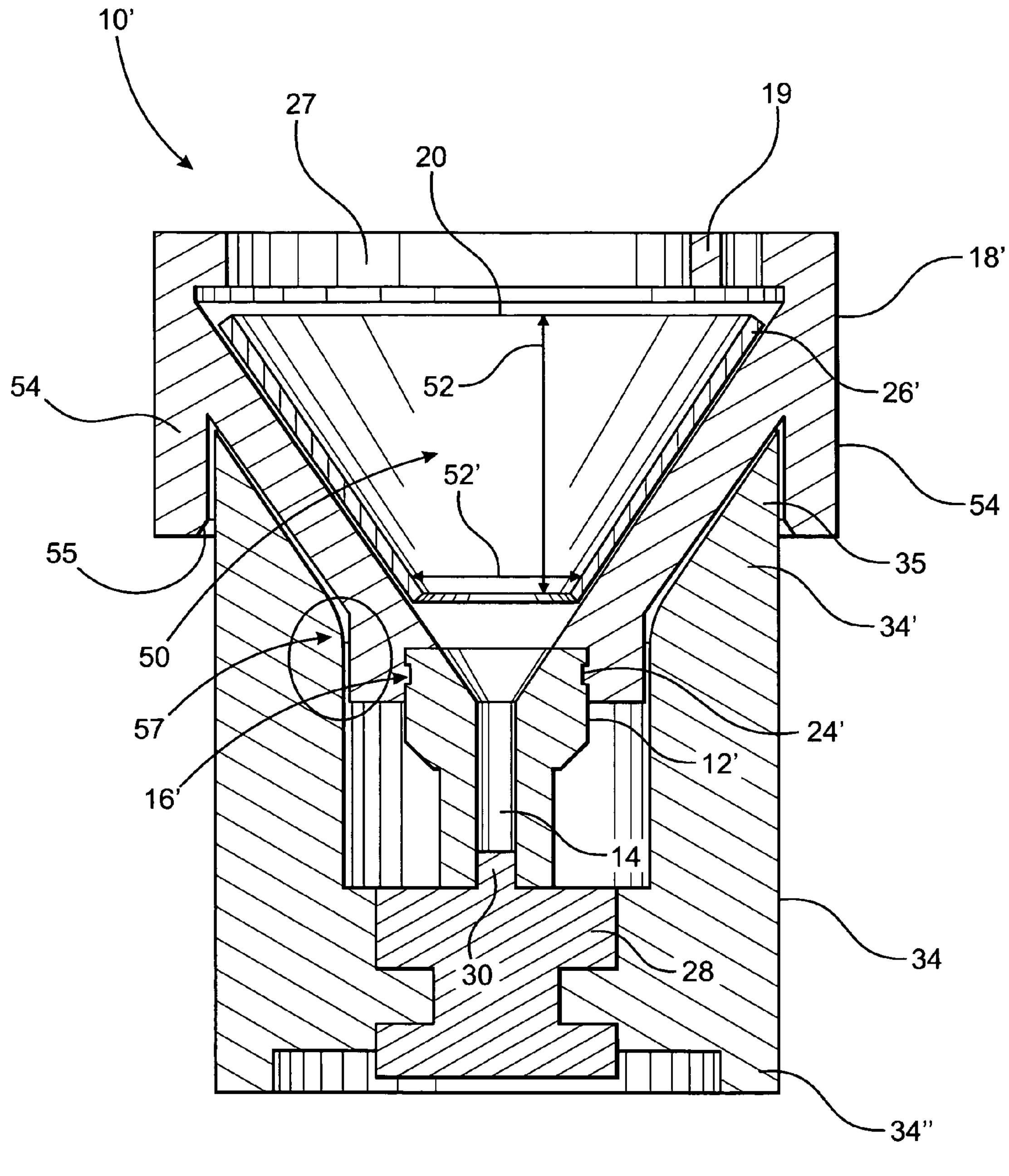
FIG. 9 is a cross-sectional view of yet another preferred embodiment of the present invention.

With primary references to FIG. 9, yet another preferred embodiment of the cathode handler assembly is represented and generally indicated as 10'. This embodiment includes equivalent structural components with certain structural modifications to be set forth in greater detail hereinafter. More specifically, the cathode handler assembly 10' comprises the structural components, preferably preassembled and disposable after use, similar to the embodiment of FIG. 1. As such, the cathode handler assembly 10' comprises a channeling unit 18' and a stopper 28 disposed in connected, supporting relation to the cathode 12'. Further, the stopper 28 includes the protruding portion 30 extending within the interior chamber 14 of the cathode 12'. The channeling unit 18' connects to and/or engages the cathode 12' at a location which is opposite to the position of the stopper 28, such that the cathode 12' is effectively sandwiched there between. As with the above noted embodiment of FIG. 1, the channeling unit 18' includes an open distal end 20 and an opposite, open proximal end disposed in direct communicating relation with the corresponding open end of the interior chamber 14 of the cathode 12'.

The additional preferred embodiment of FIG. 9 further includes a liner 26' to be disposed within the channeling unit 18' to further facilitate the transfer of sample analyte into the cathode 12' as described with reference to the above-noted embodiments of FIGS. 1, 4A and 4B. The liner 26' is disposed in overlying relation to an interior surface of the channeling unit 18' and is structured to be in substantially continuous confronting engagement with the interior surface of the channeling unit 18'. Further, with regard to the preferred embodiment of FIG. 9, structural and/or dimensional differences exists specifically, but not exclusively, with the liner 26' for purposes of facilitating flow of the analyte sample into the cathode 12'. More specifically, the height, schematically represented as 52, of the liner 26' has been reduced from that of the liner 26 of the embodiment of FIG. 1. As such, the open upper end 27 of the liner 26' is not in corresponding or substantially contiguous relation to the open distal end 20 of the channeling unit 18' but is inwardly spaced at least a minimal distal therefrom. In addition, the interior diameter, schematically indicated as 52', has been increased thereby further facilitating accurate and reliable flow of the analyte sample into the interior chamber 14 of the cathode 12'. Accordingly, the interior dimensions collectively indicated as 50 of the liner 26' are altered or modified from the corresponding dimensions of the embodiment of FIG. 1, wherein the operative features of the channeling unit 18' and the liner 26' are believed to be enhanced.

Additional structural modifications of the embodiment of FIG. 9 includes the absence of any snap-ring type of construction between the upper end 35 of the housing 34 and the interior surface of a depending flange 54 of the channeling unit 18'. In order to further facilitate a smooth interconnection and placement of the channeling unit 18' relative to the upper end 35 of the housing 34, the innermost peripheral edge 56 has been beveled or chamfered. In addition, the upper wall portions 34' and 35 each have an increased and substantially equivalent thickness as compared to the embodiment of FIG. 1. In contrast the wall portion 34", disposed below the location of the cathode 12' is proportionally the same as the embodiment of FIG. 1 and substantially less than the wall portions 34' and 35. Interconnection and support of the channeling unit 18' relative to the housing 34 is thereby further facilitated.

Other structural modifications included in the additional preferred embodiment of FIG. 9 include the peripheral dimensions of the channeling unit 18' being such as to be at least minimally spaced from the interior, correspondingly disposed surface of the housing 34, particularly at the wall portions 34' and the upper end 35 thereof. As such, at least a minimal spacing may exist there between as clearly represented. Also, in order to accommodate a smooth and easily accomplished fitting and supported interaction between the channeling unit 18' and the housing 34, the interior peripheral portion as at 57 has a predetermined radius formed thereon such that there will be no hard contacting engagement between the outer surface of the channeling unit 18' and the inner surface of the upper end of the housing as at 34', 35.

Finally, the relative dimensioning between the interior groove 16 and the exterior ring-type flange 24' is also reduced to allow easier separation or "breakaway". Similarly reduced dimensioning maybe occurred between the interior ring 24 and the upper peripheral portion of the cathode 12'.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A cathode handler assembly structured to facilitate passage of an analyte into a cathode, said cathode handler assembly comprising:

a housing, a channeling unit connected to said housing and disposed and structured to direct analyte flow into the cathode, a stopper connected to said housing and disposed in flow restricting engagement with the cathode, and said channeling unit and said stopper cooperatively disposed and structured to facilitate analyte flow into a cathode and a retention of the analyte therein.

2. A cathode handler assembly of claim 1 wherein said housing is disposed in supporting relation to both said channeling unit and said stopper.

3. A cathode handler assembly of claim 2 wherein said channeling unit is disposed on an interior of said housing in concurrently connected relation to said stopper.

4. A cathode handler assembly of claim 1 wherein said channeling unit is disposed in communicating relation to a first open end of an interior chamber of the cathode.

5. A cathode handler assembly of claim 4 wherein said stopper is disposed in sealing engagement with a second open end of the interior chamber of the cathode.

6. A cathode handler assembly of claim 1 wherein said channeling unit further comprises an analyte cap holder.

7. A cathode handler assembly of claim 6 wherein said analyte cap holder structured and disposed to extend outward from said channeling unit.

8. A cathode handler assembly of claim 7 wherein said analyte cap holder further structured to extend toward the interior of said channeling unit.

9. A cathode handler assembly of claim 6 wherein said analyte cap holder comprises at least one aperture dimensioned and structured to retain analyte cap material therein and selectively permit passage of the analyte cap material therethrough.

10. A cathode handler assembly of claim 1 wherein said stopper is disposed in sealing engagement with an open end of an interior chamber of the cathode.

11. A cathode handler assembly of claim 10 wherein said channeling unit is disposed in spaced relation to said stopper and in communicating relation to the interior chamber of the cathode.

12. A cathode handler assembly of claim 1 wherein said stopper and said channeling unit are disposed in supporting engagement with opposite ends of the cathode and cooperatively positioned and structured to substantially sandwich the cathode there between.

13. A cathode handler assembly of claim 12 wherein said stopper is at least partially dimensioned and disposed for penetrating, sealing engagement into the interior chamber of the cathode.

14. A cathode handler assembly of claim 13 wherein said stopper includes a protruding segment disposed and dimensioned in penetrating relation within the interior chamber of the cathode and in sealing engagement with a corresponding open end of the cathode.

15. A cathode handler assembly of claim 1 wherein said channeling unit comprises a liner disposed in overlying relation to an interior surface thereof.

16. A cathode handler assembly of claim 15 wherein said channeling unit includes an open distal end and an open proximal end, said liner extending substantially continuously between said open distal and proximal ends.

17. A cathode handler assembly of claim 16 wherein said open distal end of said channeling unit is disposed and structured for introduction of analyte flow into said channeling unit.

18. A cathode handler assembly of claim 17 wherein said open proximal end is disposed and structured for passage of analyte flow into an interior chamber of the cathode.

19. A cathode handler assembly of claim 1 wherein said channeling unit and said housing comprise matingly fit cooperative grooves disposed to allow for outward detachment of said channeling unit from said housing when said grooves align and substantially inhibit detachment when said grooves are misaligned.

20. A single use, disposable cathode handler assembly structured to facilitate passage of an analyte into a cathode, comprising:

a housing interconnected in supporting relation to the cathode, a channeling unit connected to the cathode and comprising an open distal end and an open proximal end, said channeling unit comprising an analyte cap holder, said analyte cap holder comprising an aperture dimensioned and structured to retain analyte cap material and selectively allow passage of the analyte cap material therethrough, a stopper disposed in analyte retaining engagement with the cathode, and said channeling unit and said stopper cooperatively disposed and structured for facilitating analyte flow into the cathode and a retention therein.

21. A single use, disposable cathode handler assembly of claim 20 wherein said housing and said channeling unit are disposed in locking engagement with one another.

22. A single use, disposable cathode handler assembly of claim 21 wherein said locking engagement between said housing and said channeling unit is at least partially defined by interconnecting engagement of at least one exterior groove disposed on said housing and at least one exterior groove disposed on said channeling unit, said grooves disposed to allow for outward detachment of said channeling unit from said housing when said grooves align and substantially inhibit detachment when said grooves are misaligned.

23. A single use, disposable cathode handler assembly of claim 20 wherein said channeling unit and said housing are cooperatively disposed and structured in clamping, displacement resisting engagement with the cathode.

24. A single use, disposable cathode handler assembly of claim 20 wherein said analyte cap holder is further structured to extend outward from said channeling unit.

25. A single use, disposable cathode handler assembly of claim 20 wherein said channeling unit comprises a substantially conical, funneling configuration.

26. A single use, disposable cathode handler assembly of claim 20 further comprising a liner disposed in overlying relation to an interior surface of said channeling unit.

27. A single use, disposable cathode handler assembly of claim 26 wherein one end of said liner is disposed in contiguous relation to an open interior chamber of the cathode.

28. A single use, disposable cathode handler assembly of claim 20 wherein said stopper and said channeling unit are connected in supported relation to the housing on an interior thereof.

29. A single use, disposable cathode handler assembly of claim 28 wherein said housing is disposed in stable locking engagement with said stopper.

30. A single use, disposable cathode handler assembly of claim 29 wherein said stable locking engagement is accomplished through stabilizing interaction between at least one interior groove on said housing and at least one exterior groove on said stopper.

31. A single use, disposable cathode handler assembly of claim 28 further comprising said housing disposed in stable locking engagement with said channeling unit.

32. A single use, disposable cathode handler assembly of claim 31 wherein said stable locking engagement is accomplished through stabilizing interaction between at least one exterior groove on said housing and at least one exterior groove on said channeling unit.

* * * * *